(12) United States Patent
Wiese et al.

(10) Patent No.: US 6,757,369 B1
(45) Date of Patent: Jun. 29, 2004

(54) LINE SHARING FOR POTS AND DSL SERVICES

(75) Inventors: Robert G. Wiese, Liberty, MO (US); David A. Rush, Merriam, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 10/202,569

(22) Filed: Jul. 24, 2002

(51) Int. Cl.[7] .................................................. H04M 11/00
(52) U.S. Cl. ................................ 379/93.08; 379/93.05; 379/93.09
(58) Field of Search ..................... 379/93.08, 93.09, 379/93.01, 93.05, 93.06, 93.07, 27.06, 399.01, 27.01, 27.08, 100.15, 100.16, 9.05

(56) References Cited

U.S. PATENT DOCUMENTS 6,272,209 B1    8/2001  Bridger et al. ................ 379/27
6,272,553 B2    8/2001  Way et al. ................... 709/250
6,546,089 B1 *  4/2003  Chea, Jr. et al. ......... 379/93.09

OTHER PUBLICATIONS

Elo et al. ; Multiplexing and demultiplexing ... transmission connection; Aug. 17, 2000; WO 00/48314.*

* cited by examiner

Primary Examiner—Melur Ramakrishnaiah

(57) ABSTRACT

A voice over DSL telephone system for a customer premises. The system includes a network interface device having a DSL filter coupling DSL service from a central office to the customer premises wiring and a switch for automatically connecting POTS service from the central office to the customer premises wiring whenever there is no active integrated access device, IAD, connected to the wiring. A detection circuit detects the presence or absence of the IAD and opens and closes the switch accordingly. Both DSL and POTS ports of an IAD may then be connected to the same customer premises wiring. Telephone sets are coupled to the customer premises wiring through low pass filters which block DSL frequencies.

15 Claims, 2 Drawing Sheets

LINE SHARING FOR POTS AND DSL SERVICES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to customer premises telecommunications systems and more particularly to a system which uses existing customer premises wiring for both POTS and DSL services without interference with local exchange carrier POTS service.

The common telephone service provided to customer premises, including homes and businesses, is analog service provided over copper wires usually referred to as twisted pair. This service is referred to as POTS, or plain old telephone system, service. It is sometimes considered to be synonymous with the public switched telephone network, PSTN. Most of the PSTN now carries signals digitally. However, POTS service from the local exchange carrier, LEC, central office, CO, to customer premises is analog and carried over copper wire. In addition to voice, the tip and ring signals and power to operate telephone sets in the customer premises are carried over the copper wires. An advantage of this system is that the telephone system does not depend on having power available at the customer premises. The CO normally uses standard grid power to operate and has emergency power backup systems which keep the telephone system operating in emergency situations.

Digital subscriber loops or lines, DSL, were developed to provide digital data service over the same twisted pair lines which are used for POTS. This type of service has great advantage when customers connect computers to the Internet or other networks from their homes or small business premises. Both POTS service and DSL service can be provided over the same copper wires so that no additional expense of running extra lines for DSL is required. POTS service operates at frequencies below 4 KHz while DSL operates at frequencies above 4 KHz up to several MHz. It is therefore a simple matter to separate the signals by frequency filters.

As the DSL service has become more available, it is becoming common to provide voice over DSL, VoDSL, service. In this type of service, the analog telephones in a customer premises are connected to a device, e.g. a VoDSL Integrated Access Device (IAD), which converts the analog telephone signals to digital signals and sends them to the CO over a DSL connection. An example of an IAD is the CPE, customer premises equipment, described in U.S. Pat. No. 6,272,209 issued on Aug. 7, 2001. This arrangement has a number of advantages. For example, a number of separate telephone voice signals can be transmitted simultaneously over one DSL connection. Data signals may also be transmitted over the DSL connection at the same time. There is no need to run additional twisted pairs when a customer wants additional telephones or additional computer connections. This arrangement effectively extends the PSTN digital system past the CO and into the customer premises.

VoDSL systems must have a source of electrical power. It has not proven practical to provide power from the CO as is done for POTS service. The power requirements are too great. As a result, the systems use power from the customer premises. For emergency purposes, the systems may have batteries for backup when the AC power is lost. However, such systems must be maintained by the customer to be sure that the backup batteries are charged and are replaced at regular intervals. In any case, backup batteries have a limited amount of power available and will run down after a long outage of AC power.

As VoDSL systems become more common, more customers want to perform their own installation. This requires that the system be easy and simple to install. Such systems should be designed to plug into existing wiring to the extent possible. Running new wiring in a customer premises requires a major effort which most customers would not want to undertake. It is also desirable that an IAD be located close to a customer's personal computer, since they often have a network connection directly to the computer. However, in existing systems IADs must be connected between the copper wires entering the premises and the internal wires connected to the telephone sets. This normally requires breaking or interrupting the wiring at or near a location on the exterior of the customer premises. The analog signals between the IAD and the telephone sets in the customer premises must be isolated from the POTS service connection to the CO.

It would be desirable to have a voice over DSL system which is simple to install, does not require additional wiring in the customer premises and which provides telephone service when the VoDSL system loses power.

SUMMARY OF THE INVENTION

A voice over DSL system according to the present invention includes an improved network interface device, conventional customer premises wiring, and an integrated access device having both DSL and POTS ports coupled to the customer premises wiring. The improved network interface device includes a filter which couples DSL frequencies across the network interface device at all times and an automatic switch which opens when an integrated access device is operating to isolate POTS service in the customer premises from POTS service in a local exchange carrier central office.

In one embodiment, the invention includes a DSL blocking filter between a telephone set and its connection to the customer premises telephone wiring.

DETAILED DESCRIPTION OF EMBODIMENTS

Figure 1:
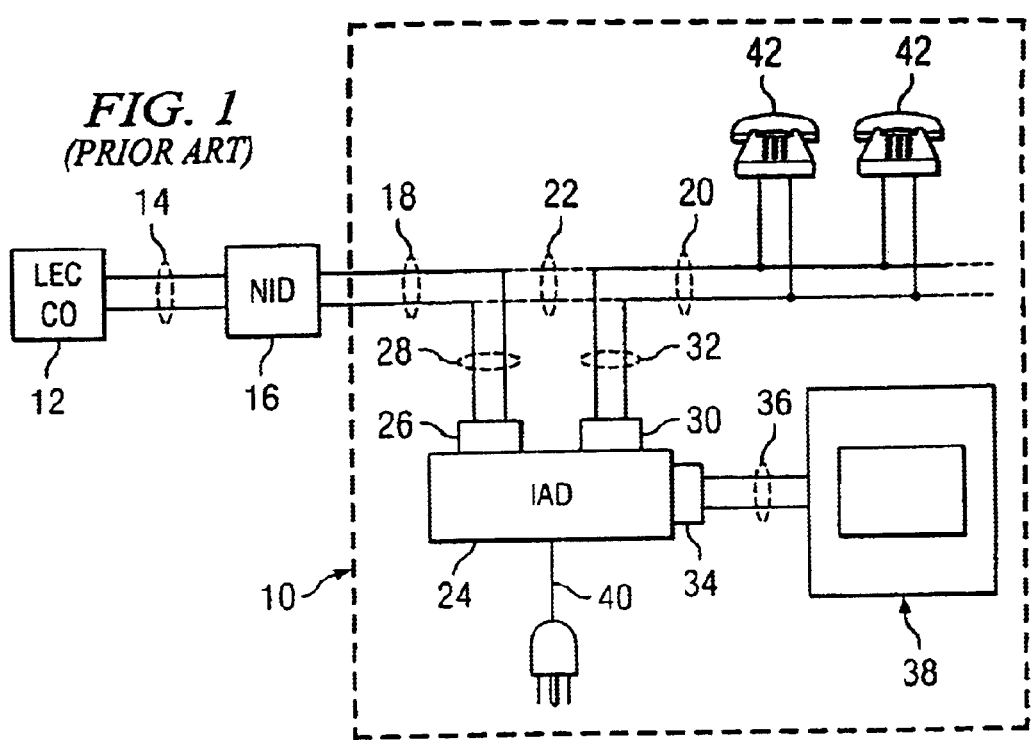
FIG. 1 is a block diagram of prior art interconnection of voice over DSL service from a local exchange carrier to a customer premises telecommunications system.

With reference to FIG. 1, there is illustrated a conventional or prior art system for providing VoDSL service to a customer premises indicated by the dotted line box 10. A local exchange carrier, LEC, central office, CO, 12 contains the equipment for providing both POTS service and DSL service. These services may be connected to the customer premises 10 over a pair of copper wires 14. The wires 14 are terminated at a network interface device, NID, 16 which is normally located on an outer surface, e.g. wall, of the customer premises 10. The NID 16 normally identifies the point of demarcation between telephone company owned equipment and customer owned equipment inside the premises 10.

The NID 16 couples the signals from wires 14 to telephone wiring 18 and 20 within the premises 10. In a system having only POTS service, the wiring 18 and 20 may be directly connected as indicated by dotted lines 22.

An integrated access device, IAD, 24 has a DSL port 26 connected by wires 28 to the telephone wiring 18 leading from the NID 16. IAD 24 has a POTS port 30 connected by wiring 32 to the telephone wiring 20. IAD 24 may also have a network port 34 connected by wiring 36 to a computer 38. The IAD 24 is connected to standard AC power through a power cord 40. A number of conventional telephone sets 42 are connected to the telephone wiring 20. An example of an integrated access device which provides both VoDSL service and network connections for computers is described in co-pending U.S. Pat. No. 6,272,558, entitled "Multi-Services Communications Device," issued Aug. 7, 2001, which is incorporated by reference herein in its entirety.

In the system of FIG. 1, the DSL service from CO 12 is connected through wiring 14, 18 and 28 and through NID 16 to the DSL port 26 of IAD 24. The IAD 24 converts high frequency digital signals at port 26 to low frequency analog POTS signals at port 30. The IAD also provides all of the power, tip and ring, etc. signals required for POTS service at port 30. These POTS signals are coupled through wiring 32 and 20 to the telephone sets 42 which function in the same manner as if the POTS signals came from the CO 12.

As indicated above, the telephone wiring 18 and 20 can be directly connected if only POTS service is provided to the residence 10. During construction of a residence, the telephone wiring is normally run from the location of NID 16 to most of the rooms in the residence. The local exchange carrier will normally install the NID 16 on the exterior of the residence 10 and make a connection to the wiring 18. When the owner of the premises requests DSL service, the telephone wiring 18 must be cut close to the NID to isolate the wiring 20 from the POTS service from the CO 12 as indicated by dashed lines 22. If the IAD can be located near the NID 16, then wiring 28 and 32 can be fairly short. But, quite often the interior premises location corresponding to the exterior location of NID 16 is not a desirable location for the IAD 24. For example, the NID is often placed outside a garage which would not provide appropriate temperature and humidity conditions. If the NID is outside of most other rooms in the house, the owner does not want the IAD mounted on the interior wall for aesthetic reasons. In addition, a network cable 36 is often required to be run from the IAD 24 to a computer 38. The usual compromise is to place the IAD near the computer 38, since it may look like another piece of computer equipment, and then run two long pairs of wires 28 and 32 to intercept the incoming telephone wiring 18 near the NID 16.

Figure 2:
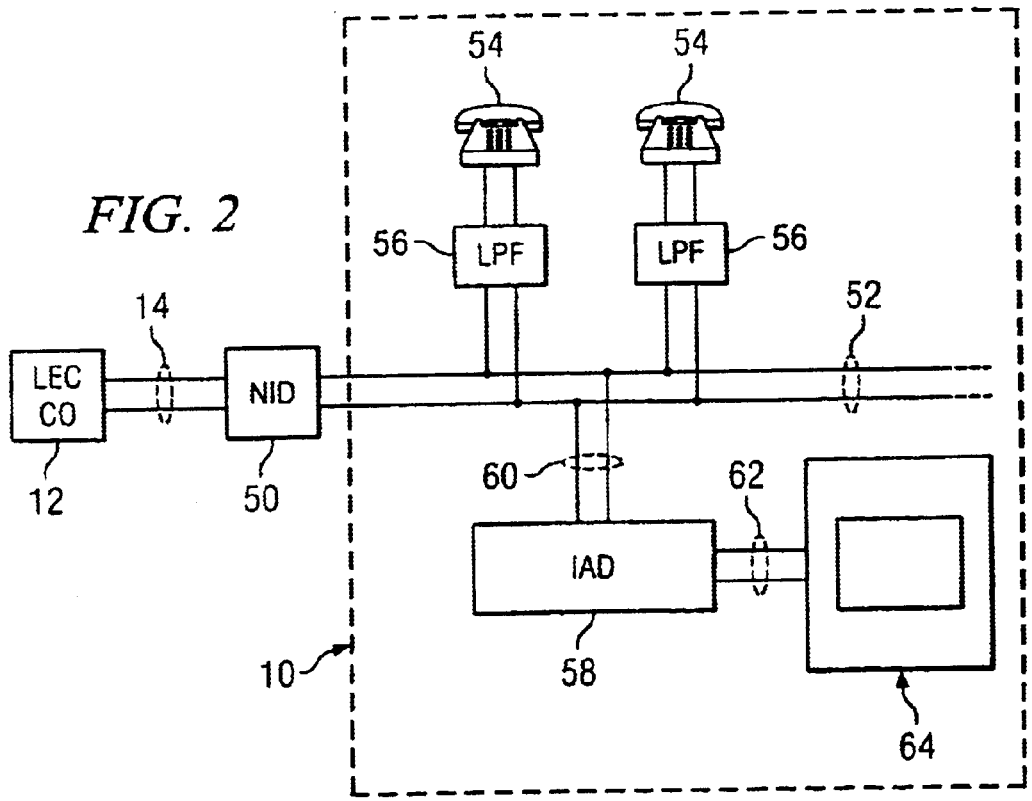
FIG. 2 is a block diagram of the interconnection of voice over DSL service from a local exchange carrier to a customer premises telecommunications system according to the present invention.

With reference to FIG. 2, a system for providing VoDSL service to the premises 10 according to the present invention is illustrated. In FIG. 2 the LEC CO 12 and wiring 14 may be the same as in FIG. 1. An improved NID 50 is mounted on an exterior wall of premises 10. The NID is connected to telephone wiring 52, preferably preinstalled, in the premises 10. The wiring 52 is normally run to and accessible in each living and work area of the premises 10. Telephone sets 54 are coupled to the wiring 54, preferably through DSL blocking low pass filters 56. Filters 56 may be commercially available devices such as Model FIL-0002-AB sold by 2WIRE, Inc. or equivalent devices.

An IAD 58 may be located anywhere in premises 10 and is connected by a standard telephone plug set 60 to the same wiring 52 as the telephone sets 54. IAD 58 may have a network connection 62 to a computer 64. The IAD 58 may be connected to wiring 52 at any accessible point in the premises 10, i.e. essentially anywhere in the premises 10 and no extra wiring is needed to connect near the NID 50. Thus, it is convenient to locate IAD 58 near computer 62 and simply plug cable 60 into a nearby telephone jack just like plugging in telephones 54.

Figure 3:
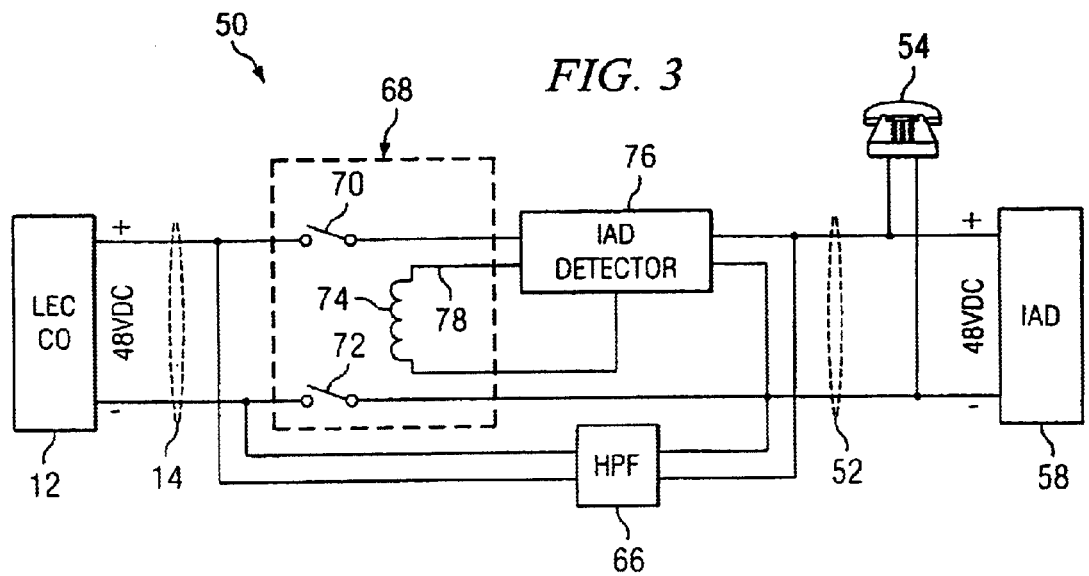
FIG. 3 is schematic diagram of a network interface device according to the present invention.

In FIG. 3, there is provided a schematic diagram of an embodiment of an improved NID 50. As shown in FIG. 2, the NID 50 couples signals from the telephone company wiring 14 to the on premises telephone wiring 52. A high pass filter or DSL pass filter 66 is connected between wiring 14 and wiring 52. Filter 66 blocks POTS voltages and signals, but allows DSL frequency signals to pass from wiring 14 to wiring 52 at all times.

The NID 50 also provides a switched connection of wiring 14 and wiring 52 through a relay 68. Relay 68 includes a pair of normally closed contacts 70 and 72, driven by a relay coil 74. When no current flows through coil 74, the contacts 70 and 72 close and couple all signals, including DC voltage and current between wiring 14 and wiring 52.

When the contacts 70, 72 are closed, the CO 12 can provide POTS service to telephone sets in premises 10. However, this would cause a conflict if an IAD 58 is connected to wiring 52 and is powered up. The NID 50 therefore includes an IAD detector 76 for sensing the presence of an active, i.e. powered up, IAD 58 connected to wiring 52. In this embodiment, the detector is connected in line between switch 70 and one side of on premises wiring 52. It provides an output 78 to drive the coil 74 of relay 68. When the detector 76 detects the presence of an active IAD 58, it drives current through coil 74 to open contacts 70 and 72 and disconnect POTS service from the LEC CO 12. When the IAD 58 loses power or otherwise fails to provide POTS service, the detector 76 stops driving current through coil 74 so that switches 70 and 72 close and POTS service from CO 12 is reconnected.

There are a number of ways in which the detector 76 may detect the presence of an active IAD 58. In one embodiment, detector 76 may sense the flow of DC current from wiring 14 to wiring 52 which occurs if the CO 12 is providing POTS service to telephone sets 54 and no active IAD is connected to wiring 52. If IAD 58 begins providing the DC voltages needed for POTS service, the DC current from CO 12 through detector 76 should drop essentially to zero. When that occurs, the current sensing circuit uses the IAD POTS voltage on lines 52 to drive current through coil 74 causing contacts 70 and 72 to open and stop the POTS connection to CO 12. If the IAD 58 fails when contacts 70 and 72 are open, the current through coil 74 will stop and the contacts 70 and 72 will return to their normally closed position, restoring POTS service from CO 12.

It will also be apparent that other means may be used to determine whether IAD 58 is active. For example a voltage detector may be used instead of a current detector. It would also be possible to have a dedicated signal line from IAD to detector 76. To avoid running extra wires for such dedicated signal line, the IAD 58 could generate a signal, e.g. a fixed frequency tone, on lines 52 when it is active and the detector 76 could detect the signal and switch relay 68 in response. Depending on the type of detection circuitry used, the IAD detector may be connected to standard AC power through a power cord, not shown, and may include a backup battery.

This operation of the NID 50 also permits installation of the IAD by the owner of the premises without wiring changes. The NID 50 may be installed when no VoDSL service is supplied to the premises 10. Since the NID 50 is located outside the premises 10, it may be installed without entering the premises and without changing the on premises wiring. With the NID 50 in place, the rest of the system can be installed by plugging cables into standard sockets. The IAD 58 may be plugged into any available telephone jack with a standard connector cable. DSL filters may be installed for each telephone set by unplugging the telephone from its jack and inserting an inline filter such as the one described above.

As shown in FIG. 2, the IAD 58 is connected to the standard in house wiring 52 for both DSL and POTS service. Since these two services operate at different frequencies, it is a simple matter to make one connection to the IAD and separate the signals internally.

Figure 4:
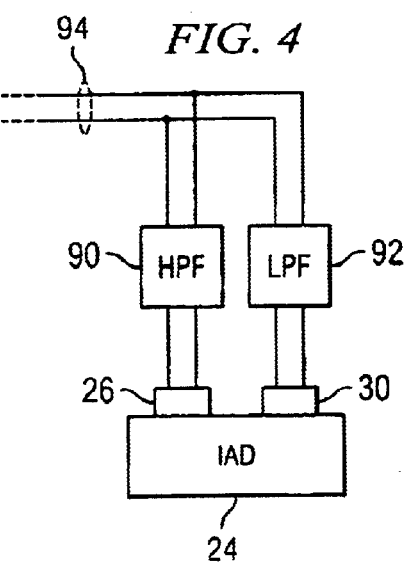
FIG. 4 is a block diagram of the interconnection of an integrated access device connection to telephone wiring carrying both POTS and DSL signals.

FIG. 4 provides a simple filter arrangement which allows IAD 24 of FIG. 1 to be used in the FIG. 2 embodiment. IAD 24 has separate DSL port 26 and POTS port 30. In FIG. 4, a high pass filter 90 is connected to DSL port 26. A low pass filter 92 is connected to POTS port 30. The two filters 90, 92 are connected to a single pair of wires 94, which may be connected to the in house wiring 52. The filter 90 allows DSL signals to pass between wires 94 and DSL port 26, but blocks POTS signals. The filter 92 allows POTS signals to pass between wires 94 and POTS port 30, but blocks DSL signals.

This arrangement illustrates how the present invention allows the IAD 58 to be located essentially anywhere in premises 10 without modifying the originally installed telephone wiring. The IAD 58 may exchange DSL signals with the CO 12 over the in house wiring 52. It may simultaneously communicate with the telephones sets 54 in POTS service which operates in a different frequency band. As noted above, it is preferred to use DSL blocking, i.e. low pass, filters 56 for each telephone set 54. The in house wiring 52 serves as a common bus for both frequency bands.

While the present invention has been illustrated and described in terms of particular apparatus and methods of use, it is apparent that equivalent parts may be substituted of those shown and other changes can be made within the scope of the present invention as defined by the appended claims.

What we claim as our invention is:

1. A customer premises voice over DSL telephone system comprising:
    a pair of customer premises wires adapted for coupling telephony signals to telephone sets,
    an integrated access device coupling both DSL and POTS signals to said pair of customer premises wires at the same time,
    a switch connecting said pair of customer premises wires to a pair of telephone company wires when said integrated access device is not active and disconnecting said pair of customer premises wires from the telephone company wires when said integrated access device is active, and
    a high pass filter coupling signals between said pair of customer premises wires and the telephone company wires.

2. A customer premises voice over DSL telephone system according to claim 1, further comprising:
    a telephone set coupled to said pair of customer premises wires.

3. A customer premises voice over DSL telephone system according to claim 2, further comprising:
    a low pass filter coupling said telephone set to said pair of customer premises wires.

4. A customer premises voice over DSL telephone system according to claim 3, wherein:
    said low pass filter has a cutoff frequency above the frequency of POTS signals and below the frequency of DSL signals.

5. A customer premises voice over DSL telephone system according to claim 1, wherein said high pass filter has a cutoff frequency above the frequency of POTS signals and below the frequency of DSL signals.

6. A customer premises voice over DSL telephone system according to claim 1, further comprising:
    a network interface device containing said switch and said high pass filter coupling said pair of customer premises wires to the telephone company wires.

7. A customer premises voice over DSL telephone system according to claim 1, further comprising:
    a sensing circuit detecting the presence of an active integrated access device connected to said pair of customer premises wires and providing an output causing said switch to open when an active integrated access device is connected to said pair of customer premises wires and to close when an active integrated access device is not connected to said pair of customer premises wires.

8. A customer premises voice over DSL telephone system according to claim 7, wherein:
    said sensing circuit is a current sensing circuit detecting POTS current flowing from the telephone company wires to said pair of customer premises wires and providing an output causing said switch to close when current is flowing and to open when no current is flowing.

9. A customer premises voice over DSL telephone system according to claim 7, wherein:
    said switch is part of a relay having a coil coupled to said sensing circuit.

10. A customer premises voice over DSL telephone system according to claim 1, wherein:
    said integrated access device has a DSL port for coupling DSL signals to and from the telephone company wires and a POTS port for coupling POTS signals to and from said pair of customer premises wires.

11. A customer premises voice over DSL telephone system according to claim 10, further comprising:
    a high pass filter coupling said DSL port to said pair of customer premises wires, and
    a low pass filter coupling said POTS port to said pair of customer premises wires.

12. A method for installing voice over DSL service in a customer premises, comprising:
    coupling a pair of telephone company wires carrying both DSL and POTS signals to a pair of customer premises wires with a high pass filter having a cutoff frequency above the frequency of POTS signals and below the frequency of DSL signals and with a switch which opens automatically when the customer premises includes an active integrated access device coupled to said customer premises telephone wiring and which otherwise closes.

13. A method for installing voice over DSL service in a customer premises according to claim 12, further comprising;

coupling an integrated access device to the customer premises wiring.

14. A method for installing voice over DSL service in a customer premises according to claim 13, wherein said integrated access device has a POTS port and a DSL port, further comprising:

using a high pass filter to couple said integrated access device DSL port to said pair of customer premises wires, and using a low pass filter to couple said integrated access device POTS port to said pair of customer premises wires.

15. A method for installing voice over DSL service in a customer premises according to claim 12, further comprising:

coupling a telephone set to the pair of customer premises wires through a low pass filter.

* * * * *